United States Patent
Tajima et al.

(10) Patent No.: US 7,023,113 B2
(45) Date of Patent: Apr. 4, 2006

(54) ALTERNATOR FOR VEHICLE

(75) Inventors: Susumu Tajima, Hitachinaka (JP); Yuichiro Baba, Hitachinaka (JP); Shinji Yamazaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 262 days.

(21) Appl. No.: 10/422,898

(22) Filed: Apr. 25, 2003

(65) Prior Publication Data

US 2004/0135443 A1  Jul. 15, 2004

(30) Foreign Application Priority Data

Apr. 26, 2002  (JP) .............................. 2002-126608

(51) Int. Cl.
*H02K 9/00* (2006.01)
(52) U.S. Cl. ..................... 310/68 D; 310/54; 310/58
(58) Field of Classification Search ............. 310/68 D, 310/68 R, 89, 52–65, 60 R
See application file for complete search history.

(56) References Cited

U.S. PATENT DOCUMENTS

| 4,739,204 A | 4/1988 | Kitamura et al. ......... 310/68 D |
| 4,818,906 A * | 4/1989 | Kitamura et al. ............. 310/58 |
| 5,095,235 A | 3/1992 | Kitamura .................. 310/68 D |
| 6,528,912 B1 | 3/2003 | Asao |

FOREIGN PATENT DOCUMENTS

| JP | 62236338 | 10/1987 |
| JP | 63-70262 | 5/1988 |
| JP | 04004736 | 1/1992 |
| JP | 06296348 | 10/1994 |
| JP | 10225060 | 8/1998 |
| JP | 2000-270518 | 9/2000 |
| JP | 2001-086706 A | 3/2001 |
| JP | 2002-136077 | 5/2002 |

OTHER PUBLICATIONS

Japanese Office Action Dated Oct. 17, 2005 W/ Partial English Translation ((four (4) pages).

* cited by examiner

*Primary Examiner*—Dang Le
(74) *Attorney, Agent, or Firm*—Crowell & Moring LLP

(57) ABSTRACT

An alternator for a vehicle includes a stator having a stator winding, a rotor opposing to the stator through a gap, a rectifier for converting AC power generated by the stator winding into DC power, a frame which holds the stator and has a cooling medium path at least one end thereof being opened, and an end plate for hermetically closing the opened end of the cooling medium path, wherein a cathode side rectifying element constituting the rectifier is fixed to a portion of the end plate not opposing to the cooling medium path, and a cooling member, at which an anode side rectifying element constituting the rectifier is fixed, is fixed to the end plate in an insulated state so that the anode side rectifying element is disposed at a position lower in temperature than a fixed position where the cathode side rectifying element is disposed.

21 Claims, 13 Drawing Sheets

TOP DIRECTION THE TIME OF MOUNTING ON VEHICLE

TOP DIRECTION THE TIME OF MOUNTING ON VEHICLE

TOP DIRECTION THE
TIME OF MOUNTING
ON VEHICLE

TOP DIRECTION THE TIME OF MOUNTING ON VEHICLE

ALTERNATOR FOR VEHICLE

BACKGROUND OF THE INVENTION

1. Field of the Invention

The present invention relates to an alternator for a vehicle which generates driving power for an electric load and charging power for a battery mounted on the vehicle.

2. Description of the Related Art

The conventional alternator for a vehicle is arranged as described in JP-A-2000-270518, for example, in a manner that cooling medium other than external air, for example, cooling water is circulated within the generator thereby to cool a stator, a rectifier and a voltage generator as major exothermic portions. In particular, at the time of cooling the rectifier, the rectifier is fixed at a portion of an end portion opposing to the opening portion of a cooling medium path thereby to be cooled by the cooling medium. The end portion closes the opening portion of the cooling medium.

SUMMARY OF THE INVENTION

In recent years, the alternator for a vehicle has been required to have a higher output due to the increase of a capacity of an electric load mounted on an automobile. In order to satisfy such a requirement, it is required to improve the cooling capacity of the exothermic portions of the alternator for a vehicle, for example, the rectifier. As one of plural means for satisfying such a requirement, like the conventional alternator for a vehicle, it is effective to fix the rectifier at the portion of the end portion closing the opening portion of the cooling medium which opposes to the opening portion of the cooling medium path thereby to be cooled by the cooling medium. However, at present, it is further required to improve the cooling efficiency of the rectifier.

The present invention provides an alternator for a vehicle which can improve the cooling efficiency of a rectifier.

To this end, a typical example of the present invention is arranged in a manner that a cathode side rectifying element constituting a rectifier is fixed to a portion of an end plate, for hermetically closing the opened end of a cooling medium path, not opposing to the cooling medium path, and a cooling member, at which an anode side rectifying element constituting the rectifier is fixed, is fixed to the end plate in an insulated state so that the anode side rectifying element is disposed at a position lower in temperature than a fixed position where the cathode side rectifying element is disposed.

The position lower in temperature than the fixed position of the cathode side rectifying element means a position which is near the cooling medium path and at outer side in the radial direction than the cathode side rectifying element or a position opposing to the cooling medium path.

According to the typical example of the present invention, the cathode side rectifying element is cooled by directly contacting with the cooling medium and is also cooled through the end plate constituting the cooling medium path. On the other hand, the anode side rectifying element is cooled through the end plate and the cooling member for fixing the anode side rectifying element. In this case, the cooling member for fixing the anode side rectifying element is fixed toe the end plate in the insulated state so that the anode side rectifying element is disposed at the position lower in temperature than the fixed position where the cathode side rectifying element is disposed. Thus, the anode side rectifying element is cooled with the similar cooling effect as the cathode side rectifying element. In this manner, according to the typical example of the present invention, both the cathode side rectifying element and the anode side rectifying element are cooled in a balanced state and so the cooling efficiency of the rectifier can be improved.

Another typical example of the alternator for a vehicle according to the present invention is arranged in a manner that the rectifier is fixed to the end plate for hermetically closing the opened end of the cooling medium path, and an intake hole for the cooling air is provided at a portion, of the cover member for covering the rectifier, near the rectifier and outer side in the radial direction than the rectifier.

According to the another typical example of the present invention, the end plate side of the rectifier (the cathode side rectifying element side) is cooled by directly contacting with the cooling medium and is also cooled through the end plate constituting the cooling medium path. On the other hand, the side of the rectifier in opposite to the end plate side thereof (the anode side rectifying element side) is cooled by the cooling air taken into through the intake hole. In this manner, according to the another typical example of the present invention, the rectifier can be cooled at the both side thereof and so the cooling efficiency of the rectifier can be improved.

DETAILED DESCRIPTION OF THE INVENTION

Figure 1:
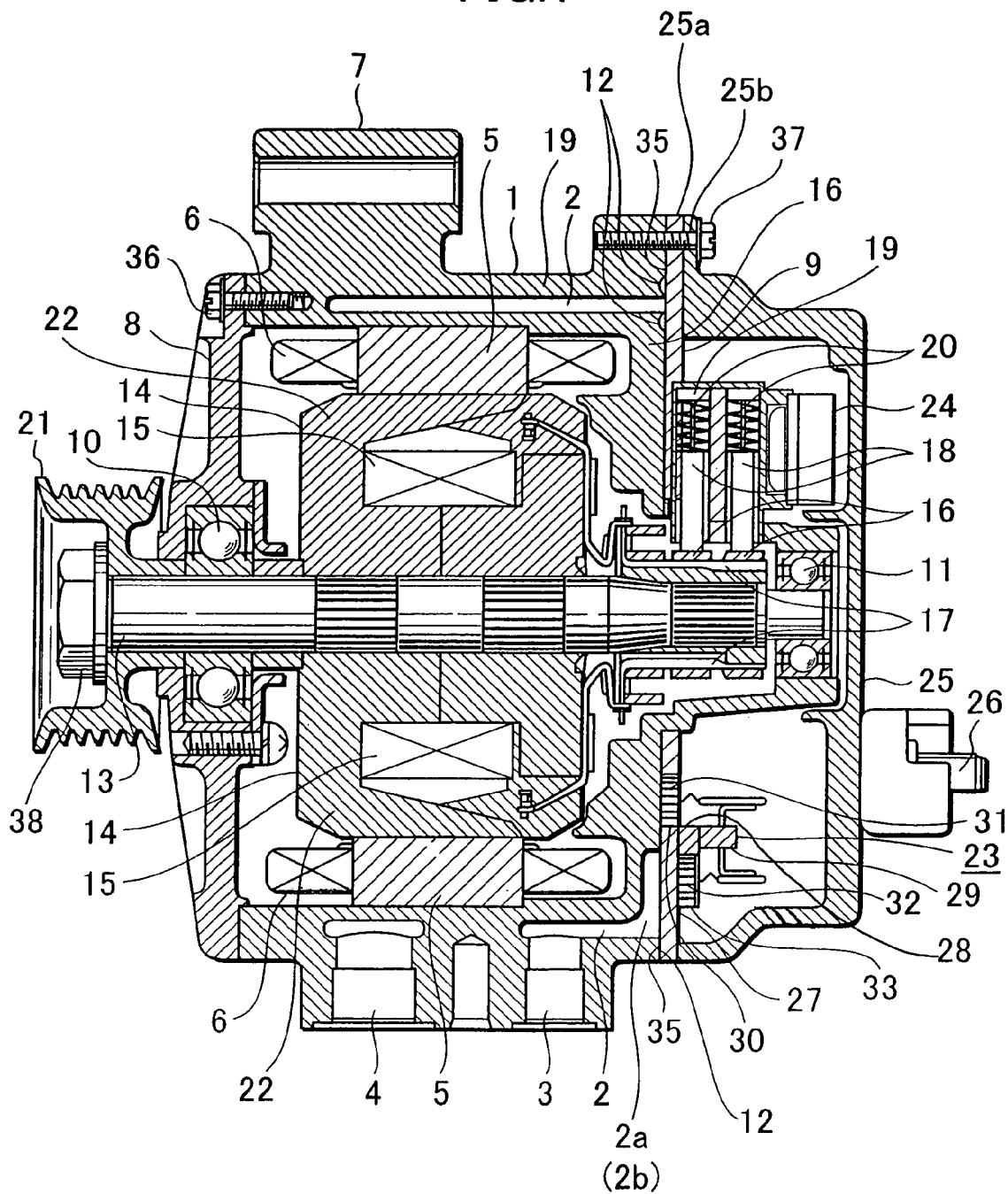
FIG. 1 is a sectional view showing the entire configuration of the alternator for a vehicle according to the first embodiment of the present invention.
Figure 2:
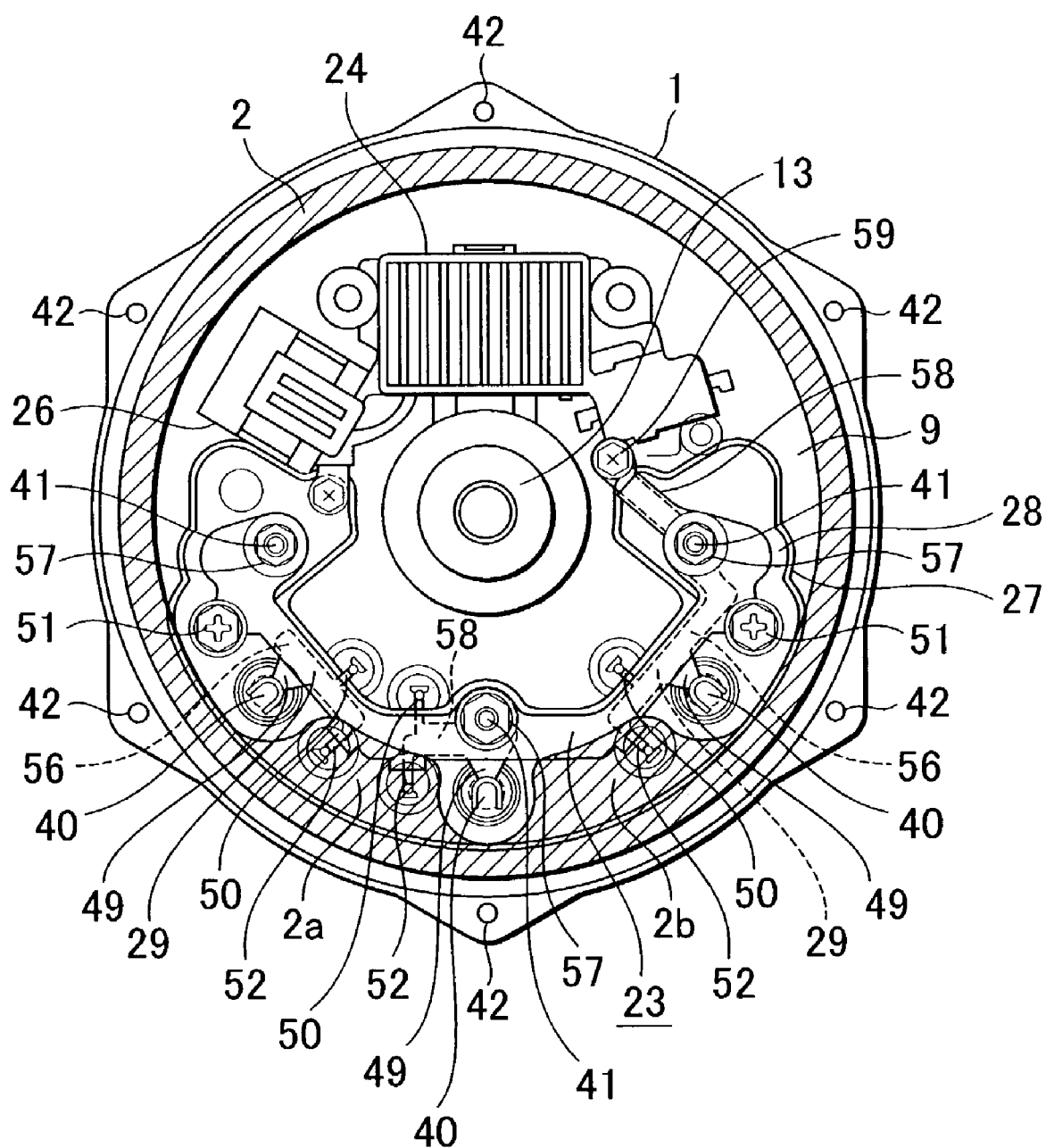
FIG. 2 is a plan view showing the configuration of the one end side of the rotation shaft of the alternator for a vehicle shown in FIG. 1.
Figure 3:
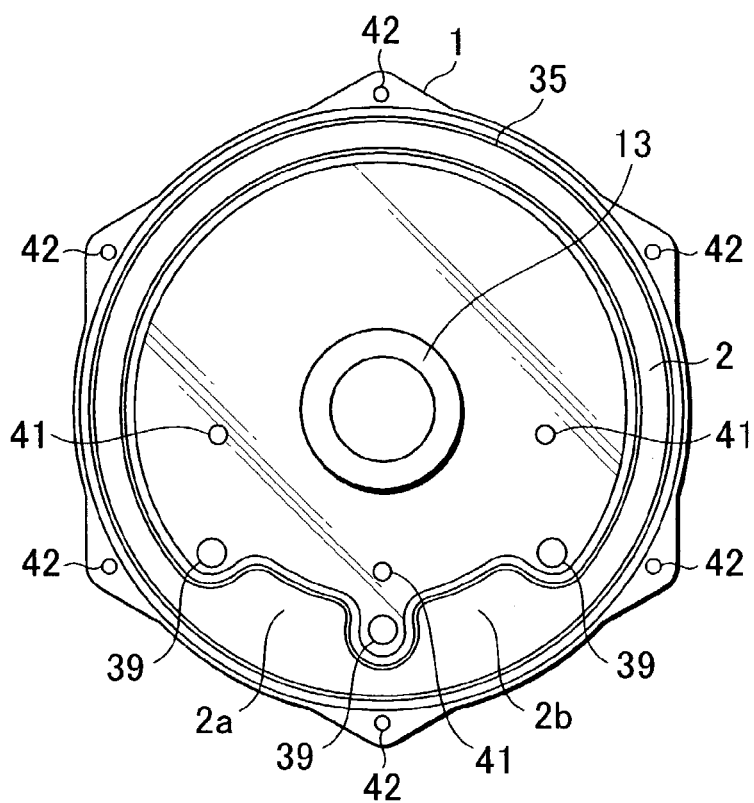
FIG. 3 is a plan view showing the configuration of a frame which is a constituent part of the cooling medium path of the alternator for a vehicle shown in FIG. 1.
Figure 4:
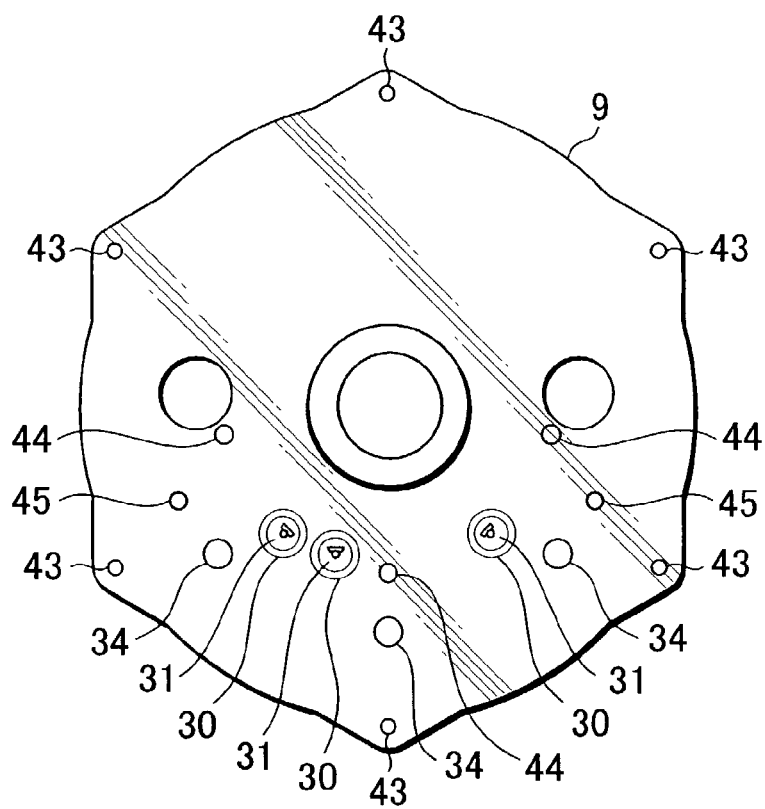
FIG. 4 is a plan view showing the configuration of an end plate which is a constituent part of the cooling medium path of the alternator for a vehicle shown in FIG. 1 and also serves as the cathode side cooling member of a rectifier applied to the alternator for a vehicle shown in FIG. 1.
Figure 5:
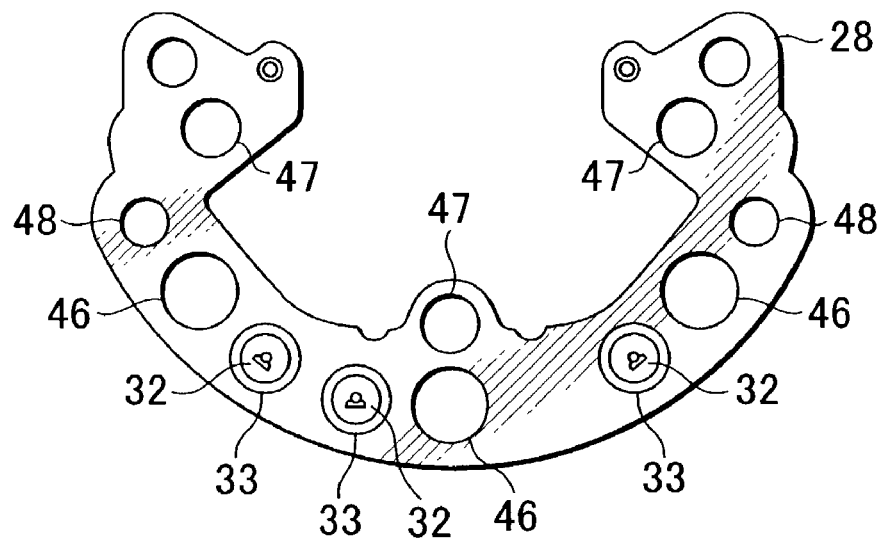
FIG. 5 is a plan view showing the configuration of the anode side cooling member of the rectifier applied to the alternator for a vehicle shown in FIG. 1.
Figure 6:
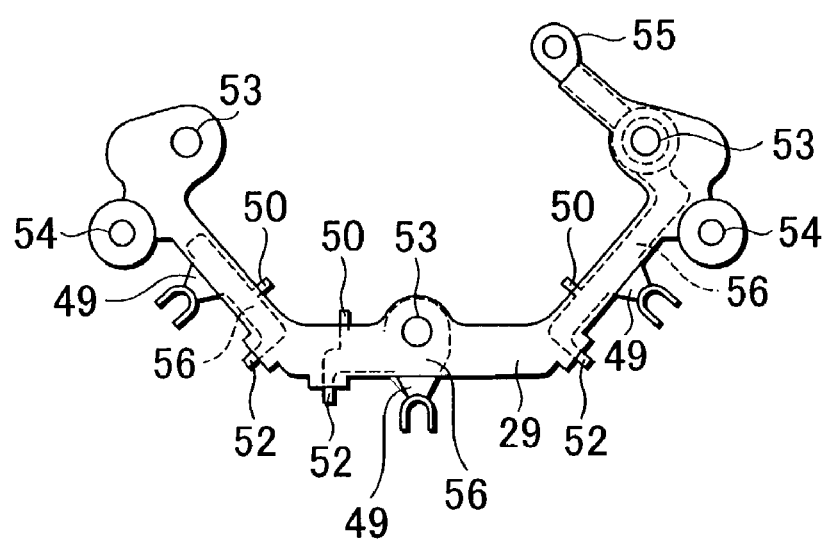
FIG. 6 is a plan view showing the configuration of the terminal table of the rectifier applied to the alternator for a vehicle shown in FIG. 1.

Hereinafter, the alternator for a vehicle according to the first embodiment of the present invention will be explained with reference to FIGS. 1 to 7. FIG. 1 shows the entire configuration of the alternator for a vehicle according to the embodiment. FIG. 2 shows the configuration of the one end side of the rotation shaft of the alternator for a vehicle according to the embodiment. FIG. 3 shows the configuration of a frame which is a constituent part of the cooling medium path of the alternator for a vehicle according to the embodiment. FIG. 4 shows the configuration of an end plate which is a constituent part of the cooling medium path of the alternator for a vehicle according to the embodiment and also serves as the cathode side cooling member of a rectifier applied to the alternator for a vehicle according to the embodiment. FIG. 5 shows the configuration of the anode side cooling member of the rectifier applied to the alternator for a vehicle according to the embodiment. FIG. 6 shows the configuration of the terminal table of the rectifier applied to the alternator for a vehicle according to the embodiment.

The alternator for a vehicle according to the embodiment is configured in a manner that the generator is supplied with a field current and also supplied with the rotation driving force of an engine serving as an internal combustion engine of an automobile to rotate a rotor thereby to generate an AC power at a stator, then the AC power thus generated is rectified by the rectifier to obtain an AC power (the driving power for the electric load and the charging power for a battery mounted on the automobile). Further, the alternator for a vehicle according to the embodiment is a so-called water-cooled type synchronous generator for circulating the cooling water within the generator thereby to cool exothermic portions such as the stator and the rectifier. Such a generator is sometimes called as an alternator or a charging generator for a vehicle. The cooling water being used is obtained by brunching a part of the cooling water which cools the engine of the automobile and is cooled by a radiator attached to the engine.

In the figure, a reference numeral 1 depicts a frame constituting the housing of the alternator for a vehicle (hereinafter, merely called a generator). The frame 1 is a vessel shaped housing member which one end in the axial line direction of the center shaft thereof is opened. The frame 1 is configured by a peripheral wall 1*a* of an almost cylindrical shape and a side wall 1*b* which closes the one end of the peripheral wall 1*a* (the other end in the axial line direction of the center shaft of the frame 1). A cooling medium path 2, the side wall 1*b* side (the other end side in the axial line direction of the center shaft of the frame 1) thereof is opened, is formed within the peripheral wall 1*a*. A cooling medium supply port 3 and a cooling medium exhaust port 4 each communicating with the cooling medium path 2 are provided in parallel at a part of the outer periphery of the peripheral wall 1*a*. An attachment portion 7 for mounting the generator at the engine or within the engine room of the automobile is provided at a part of the outer periphery of the peripheral wall 1*a*.

The cooling medium path 2 is formed in an annular shape so as to continue in the axial line direction of the center shaft of the peripheral wall 1*a* and in the peripheral direction of the peripheral wall 1*a*. A portion is provided between a communication portion of the cooling medium path 2 with the cooling medium supply port 3 (a portion at the upstream side of the cooling medium path 2) and a communication portion of the cooling medium path 2 with the cooling medium exhaust port 4 (a portion at the downstream side of the cooling medium path 2). At two portions of the outer periphery of the side wall 1*b*, notched portions 2*a*, 2*b* which are notched so as to be sunken inside in the diameter direction at the one end of the peripheral wall 1*a* are provided in adjacent to each other in the peripheral direction. Each of the notched portions 2*a*, 2*b* is a shallow round recess provided at the inside in the diameter direction.

The cooling medium supply port 3 is coupled to the upstream side (the portion where the cooling water before cooling the engine flows) of the engine cooling system of the automobile. Thus, a pat of the cooling water for cooling the engine is branched and supplied to the generator and then circulated within the cooling medium path 2 to cool the generator. The cooling medium exhaust port 4 is coupled to the downstream side (the portion where the cooling water having cooled the engine flows) of the engine cooling system of the automobile. Thus, the cooling water having cooled the generator and exhausted from the generator is joined with the cooling water having cooled the engine and then cooled by a radiator attached to the engine.

An end bracket 8 (or an end plate) is fixed by means of a bolt 36 serving as a fixing means to the one end in the axial line direction of the center shaft of the frame 1 so as to close an opening portion formed at the one end in the axial line direction of the center shaft of the frame 1 (that is, one side of the peripheral wall 1*a* in opposite to the side wall 1*b* side thereof). The end bracket 8 is an annular member and holds a bearing device 10 at the inner periphery side thereof. An end bracket 9 (sometimes an end plate) is fixed by means of a bolt 37 serving as a fixing means to the other end in the axial line direction of the center shaft of the frame 1 so as to contact with the outer surface of the side wall 1*b* through a member. The end bracket 9 is an annular member and closes the opening end of the cooling medium path 2 formed at the other end side (the side wall 1*b* side of the peripheral wall 1*a*) in the axial line direction of the center shaft of the frame 1.

An annular groove 35 is provided at the outer surface of the side wall 1*b* so as to be along the outer side edge and the inner side edge of the opening end of the cooling medium path 2 formed at the other end side (the side wall 1*b* side of the peripheral wall 1*a*) in the axial line direction of the center shaft of the frame 1. An O ring 12 serving as a sealing member (or a packing) is inserted into the annular groove 35. The O ring 12 is made from rubber with elasticity and serves to hermetically seal between the outer surface of the side wall 1*b* and the end bracket 9 thereby to prevent the water leakage from the cooling medium path 2.

The member provided between the outer surface of the side wall 1*b* and the end bracket 9 is made from silicon resin which thermal conductivity is larger than air. In this embodiment, although the explanation is made as to the case where the silicon resin is provided between the outer surface of the side wall 1*b* and the end bracket 9, material other than the silicon resin may be used as the member so long as the material has thermal conductivity equivalent to that of the silicon resin.

The center portion of the side wall 1*b* (a portion in the vicinity of the center axis of the frame 1) protrudes from the inner periphery side of the end bracket 9 toward the side opposite to the end bracket 8 side thereof. A bearing device 11 is held at the inner periphery side of the tip end of the protruding portion of the side wall 1*b*.

A stator having a stator core 5 (or a stator iron core) and a stator coil 6 (or a stator winding) is fixed to the inner periphery of the peripheral wall 1*a*. The stator core 5 is a cylindrical magnetic member and provided with plural slots at its inner periphery. The stator coil 6 is arranged in a manner that coils of three phases of u, v and w phases are respectively inserted into the corresponding slots of the stator core 5 and coupled in a star-connection.

A pole core 14 (or rotor iron) opposing to the stator core 5 through a gap is provided at the inner periphery side of the stator core 5 so as to be rotatable. The pole core 14 is fixed to a shaft 13 (or a rotation shaft) in a manner that a pair of nail-shaped cores having plural nail portions in the peripheral direction are opposed to each other in the axial line direction of the rotation shaft and that the nail portions of the one of the nail-shaped cores and the nail portions of the other of the nail-shaped cores are disposed alternatively in the peripheral direction (that is, the rotation direction of the rotor). The shaft 13 extends in the axial line direction of the center shaft of the frame 1. The one end (that is, the end bracket 8 side) of the shaft 13 is supported by the bearing device 10 so as to be rotatable. The other end (that is, the end bracket 9 side) of the shaft 13 is supported by the bearing device 11 so as to be rotatable.

A permanent magnet 22 formed by rare-earth material such as cobalt, neodymium or boron is fixed between the nail portions of the one core of the pole core 14 and the nail portions of the other core of the pole core 14. A field coil 15 (or a rotor winding) wound around a bobbin is provided at portions opposing to the inner periphery of the nail portions of the pole core 14 (or the field coil 15 may be directly wound around the portions). The field coil 15 is subjected to the insulating processing.

The one end of the shaft 13 extends to the outer side from the bearing device 10 and a pulley 21 (or a belt disc) is fixed to the tip end of the one end by means of a bolt 38 serving as a fixing means. The pulley 21 is mechanically coupled to a pulley provided at the crank shaft of the engine of the automobile through a chain or a belt serving as a driving force transmission means thereby to transmit the rotation driving force of the engine.

A slip ring 16 (or a collector ring) is fixed at a portion which is located at the other end of the shaft 13 and positioned to the inner side from the bearing device 11. The slip ring 16 is a current-collective annular member and electrically coupled to the field coil 15 through a lead wire 17. A slip ring 16 is slidably made in contact with the brush 18 and supplied with electric power (a field current) through the brush 18. The brush 18 is held by a brush holder 19 which is fixed to the surface of the end bracket 9 in opposite to the end bracket 8 side thereof. A spring 20 serving as an elastic member is provided within the brush holder 19. The spring 20 presses the brush 18 so that the brush 18 is slidably made in contact with the slip ring 16.

Through holes 39 are formed so as to be arranged in a circular shape at a portion of the side wall 1*b* between the end portions in the peripheral direction of the notched portions 2*a*, 2*b*, a portion of the side wall 1*b* on the end portion side in the peripheral direction of the notched portion 2*a* in opposite to the notched portion 2*b* side thereof, and a portion of the side wall 1*b* on the end portion side in the peripheral direction of the notched portion 2*b* in opposite to the notched portion 2*a* side thereof. The through holes 39 are provided so as to protrude terminals 40, which are electrically coupled to the coils of the respective phases, from the side wall 1*b* toward the end bracket 9 side. Bolts 41 are buried so as to protrude on the end bracket 9 side at portions of the side wall 1*b* inner side from the through holes 39 in the radial direction. Screw holes 42 to be meshed with the bolts 37 are formed at six portions on the outer periphery side of the frame 1. Each of the screw holes 42 is formed as a through hole.

A rectifier 23 and a regulator 24 (or a voltage regulator) are fixed at the surface of the end bracket 9 on the side opposite to the end bracket 8 side thereof. The rectifier 23 full-wave rectifies the three-phase current output from the stator coil 6 to obtain DC output. The regulator 24 controls the field current flowing into the field coil 15 through the brush 18 thereby to adjust the three-phase current output from the stator coil 6.

The side of the end bracket 9 in opposite to the end bracket 8 side thereof (that is, a side where the rectifier 23, the regulator 24 and the brush holder 19 are fixed) is covered by a cover 25 (or a cover member). The cover 25 is provided with a flange 25*a* extending toward the outside in the radial direction. A through hole 25*b* is formed at a portion corresponding to the screw hole 42 of the flange 25*a*.

A terminal 26 is exposed outside from the cover 25. The terminal 26 is electrically coupled to the rectifier 23. A terminal (not shown) of the vehicle side wiring is electrically coupled to the terminal 26 in order to supply a DC output rectified by the rectifier 23 to the outside, that is, the vehicle side (such as the battery and the electric load). Slanted portions in FIG. 2 show the cooling medium path 2 and the notched portions 2*a*, 2*b*.

The rectifier 23 is formed by a laminated member in which the end bracket 9 also serving as a cathode side cooling plate, an insulation member 27, an anode side cooling plate 28 and a terminal table 29 are laminated in this order. The end bracket 9 is a plate-shaped member and made of aluminum like the frame 1 and the end bracket 8. As described above, the end bracket 9 is fixed to the outer surface of the side wall 1*b* through the silicon resin. Through holes 43 for passing the bolts 37 therethrough are formed at portions (six portions on the outer periphery side of the end bracket 9) corresponding to the screw holes 42 of the end bracket 9. The cover 25 and the end bracket 9 can be fixed to the frame 1 by inserting the bolts 37 into the through holes 25*b*, 43 and screwing the bolts 37 with the screw holes 42, respectively.

Through holes 34 are formed at portions corresponding to the through holes 39 of the end bracket 9. The terminal 40 passes through the corresponding one of the through holes 34 so as to protrude to the end bracket 9 side from the side wall 1*b* side. Through holes 44 are formed at portions of the end bracket 9 opposing to the buried positions of the bolts 41 at the inner side of the radial direction than the through holes 34, respectively. The through holes 44 pass the bolts 41 therethrough, respectively. Two through holes 30 are formed at portions of the end bracket 9 at the inner side of the radial direction than the portions corresponding to the notched portions 2*a* and also at the inner side of the radial direction than the through holes 34, respectively. A through hole 30 is formed at a portion of the end bracket 9 at the inner side of the radial direction than the portion corresponding to the notched portion 2b and also at the inner side of the radial direction than the through hole 34.

These three through holes 30 are arranged in a circular shape at portions not opposing to the cooling medium path 2 of the end bracket 9. The cathode side of a rectifying diode 31 serving as a cathode side rectifying element is pressed and buried into each of the through holes 30. The bottom surface of each of the rectifying diodes 31 contacts with the outer surface of the side wall 1b through a silicon member provided between the outer surface of the side wall 1b and the end bracket 9. Each of screw holes 45 is formed at an almost intermediate portion between a corresponding pair of the through holes 34 and 44 of the end bracket 9 which is outside of the radial direction than the corresponding through hole 34.

In this embodiment, the rectifying diodes 31 are buried at portions of the end bracket 9 which relatively close to the cooling medium path 2. However, since the cooling medium is prevented from being leaked from the cooling medium path 2 by the insulation member and the O ring 12 provided between the outer surface of the side wall 1b and the end bracket 9, the rectifying diodes 31 does not directly contact with the rectifying diodes 31.

The anode side cooling plate 28 is a cooling fin of a circular shape (or a horse-shoe shape) and made from aluminum member like the end bracket 9. The anode side cooling plate 28 is fixed to the surface of the end bracket 9 at the side in opposite to the end bracket 8 side thereof through the insulation member 27 so that the inner diameter of the anode side cooling plate is positioned at a portion of the end bracket 9 at the outer side of the radial direction than the through holes 30. Through holes 47 are formed at portions of the anode side cooling plate 28 opposing to the through holes 44, respectively. Each of the through holes 47 passes the bolt 41 therethrough Through holes 46 are formed at portions of the anode side cooling plate 28 opposing to the through holes 34 at the outer side of the radial direction than the through holes 47 of the anode side cooling plate 28, respectively. Each of the through holes 46 passes therethrough the terminal 40 which protrudes on the end bracket 9 side from the side wall 1b side. Through holes 48 are formed at portions of the anode side cooling plate 28 opposing to the screw holes 45 at the outer side of the radial direction than the through holes 47 of the anode side cooling plate 28, respectively. Each of the through holes 48 passes a screw 51 therethrough. Two through holes 33 are formed at portions of the anode side cooling plate 28 opposing to the notched portions 2a at the outer side of the radial direction than the through holes 47 of the anode side cooling plate 28, respectively. A through hole 33 is formed at a portion of the anode side cooling plate 28 opposing to the notched portion 2b at the outer side of the radial direction than the through hole 47 of the anode side cooling plate 28.

The through holes 33, 46 and 48 are arranged in a circular shape on the anode side cooling plate 28 and the through holes 33 are arranged so as to be disposed at portions of the anode side cooling plate 28 opposing to the cooling medium path 2. The cathode side of a rectifying diode 32 serving as an anode side rectifying element is pressed and buried into each of the through holes 33. Thus, the rectifying diodes 32 are disposed at positions closer to the cooling medium path 2 at the outer side of the radial direction than the rectifying diodes 31. In particular, according to the embodiment, the rectifying diodes 32 are disposed at positions opposing to the cooling medium path 2. These positions are lower in temperature than the buried positions (fixed positions) of the rectifying diodes 31.

The bottom surface of each of the rectifying diodes 32 contacts with the surface of the side of the end bracket 9 in opposing to the end bracket 8 side thereof through the insulation member 27. The insulation member 27 is a sheet-shaped member formed in a circular shape (or a horse-shoe shape) along the configuration of the anode side cooling plate 28 and the area of the insulation member 27 is slightly larger than that of the anode side cooling plate 28. Silicon pound in paste form is coated or applied on the surface of the insulation member 27 opposing to the end bracket 9 and on the surface of the insulation member 27 opposing to the anode side cooling plate 28. Thus, the insulation member 27 has thermal conductivity.

The terminal table 29 is a coupling member (or a terminal assembly) configured by integrally forming metal members 56 (or conductive members) for coupling the rectifying diodes 31, 32 in a bridge fashion with insulating resin and is a plate shaped member formed in a circular shape (or a horse-shoe shape) along the shape of the anode side cooling plate 28. Dotted lines in FIGS. 2 and 6 show the metal members 56. Each of the metal members 56 has terminals 49, 50 and 52. The cathode side of the rectifying diode 31 is electrically and mechanically coupled to the terminal 50 by means of soldering or welding. The anode side of the rectifying diode 32 is electrically and mechanically coupled to the terminal 52 by means of soldering or welding. The corresponding one of terminals 40 coupled to the respective phases of the stator coil 6 is caulked and electrically and mechanically coupled to the terminal 49.

Through holes 53 are formed at portions of the terminal table 29 opposing to the holes 47, respectively. The bolt 41 is passed through the end bracket 9, the anode side cooling plate 28 and the terminal table 29 in this order and fastened by a nut 57 thereby to fix the rectifier 23 to the end bracket 9 and simultaneously fix the end bracket 9 to the frame 1. Through holes 54 are formed at portions of the terminal table 29 opposing to the through holes 48, respectively. A screw 51 passes through each of the through holes 54. The anode side cooling plate 28 and the terminal table 29 are laminated in this order on the end bracket 9, then the screw 51 is inserted into the through holes 54, 48 and the screw hole 45 and fastened, whereby the anode side cooling plate 28 and the terminal table 29 are fixed to the end bracket 9. A terminal 59 is provided at one end in the peripheral direction of the terminal table 29. The terminal 58 serves to electrically couple the rectifier 23 with the regulator 24 and extends from one of the metal members 56 to the regulator 24 side and fixed to the regulator 24 by mean of a screw 59.

As explained above, according to the embodiment, since the rectifying diodes 31 are buried within the end bracket 9 constituting the cooling medium path 2, the thermal resistance of the heat transfer path from the rectifying diodes 31 to the cooling medium can be reduced and so the cooling efficiency of the rectifying diodes 31 can be improved as compared with the conventional technique in which the rectifying diodes 31 are cooled through the cooling plate. Further, since the end bracket 9 also serves as the cathode side cooling plate, the cooling plate is not provided unlike the conventional technique, whereby the cost of the generator can be reduced.

Further, according to the embodiment, each of the rectifying diode 32 is disposed at the position closer to the path than the rectifying diode 31, that is, the position lower in the temperature than the fixed position of the rectifying diode 31. In particular, in this embodiment, the anode side cooling plate 28 is fixed to the surface of the end bracket 9 in opposite to the end bracket 8 side thereof through the insulation member 27 so that the rectifying diodes 32 are disposed at the position opposing to the cooling medium path 2. Thus, as compared with the conventional technique in which the rectifying diodes 32 are cooled through the cathode side cooling plate, the heat transfer path from the rectifying diodes 32 to the cooling medium can be made short and so the cooling efficiency of the rectifying diode 32 can be improved. Thus, the cooling performance of the rectifying diodes 32 can be improved. Further, since each of the rectifying diodes 32 is positioned at the position lower in temperature than that of the rectifying diodes 31, each of the rectifying diodes 32 can be further improved in its cooling efficiency and so can attain similar cooling effect to that of the rectifying diodes 31.

Thus, according to the embodiment, the cooling efficiency of each of the rectifying diodes 31 and 32 can be improved, and also the rectifying diodes 31 and the rectifying diodes 32 are cooled in a balanced state and so the cooling efficiency of the rectifier 23 can be improved, so that the cooling performance of the rectifier 23 can be improved.

Further, according to the embodiment, the rectifying diodes 31 are buried into the through holes 30 provided at the end bracket 9 and the bottom surfaces of the rectifying diodes 31 are made in contact with the side wall 1b through the member having a thermal conductivity higher than the air. Thus, the heat transfer of the rectifying diodes 31 can be further promoted and so the cooling efficiency of the rectifying diodes 31 can be further improved.

Furthermore, according to the embodiment, since the through holes 30 are used as holes for burying the rectifying diodes 31 of the end bracket 9 therein, the generator can be manufactured easily and the manufacturing cost of the generators can be reduced. That is, according to the embodiment, each of the rectifying diodes 31 is buried at the position opposing to the side wall 1b of the end bracket 9, that is, the position not opposing to the cooling medium path 2.

Like the conventional technique, in the case where the rectifier is provided at the portion constituting the cooling medium path so that the rectifier opposes to the cooling medium path, when the through hole is provided at the portion opposing to the cooling medium path, it is required to coat the sealing material etc. after inserting the rectifier diode therein with pressure in order to prevent the leakage of the cooling medium. According to such a technical concept, the numbers of the manufacturing processes and the constituent parts of the generator increase, so that the cost of the generator increases. On the other hand, when the hole for burying the rectifying diode is configured in a concave shape in order to prevent the leakage of the cooling medium, it becomes difficult to manage the depth of the concave portion, the diameter of the opening portion and the shape of the angle of the bottom surface of the concave portion of the hole and further it is necessary to fix the bottom surface of the rectifying diode to the bottom surface of the concave portion by means of solder or adhesive. According to such a technical concept, also the numbers of the manufacturing processes and the constituent parts of the generator increase, so that the cost of the generator increases. In contrast, like the present embodiment, when the through holes 30 are provided at the portions of the end bracket 9 not opposing to the cooling medium path 2 and the rectifying diodes are pressed and buried into the through holes 30, the aforesaid problems of the conventional technique do not arise.

Further, according to the embodiment, the notched portions 2a, 2b, which are formed by cutting parts of the cooling medium path 2 so as to be sunk inside in the radial direction at the one end of the peripheral wall 1a, are provided at the two portions of the outer surface of the side wall 1b so as to be adjacent to each other in the peripheral direction. Further, the anode side cooling plate 28 is fixed to the surface at the side of the end bracket 9 in opposite to the end bracket 8 side thereof so that the rectifying diodes 32 are disposed at the portions opposing to the notched portions 2a, 2b of the end bracket 9. Thus, it is not necessary to spread the cooling medium path 2 in a complicated manner at the one end of the peripheral wall 1a. Accordingly, such phenomena can be prevented from occurring that the resistance of the path increases, the cooling medium hardly circulates within the cooling medium path 2 and so the cooling efficiency of the generator is degraded.

Figure 7:
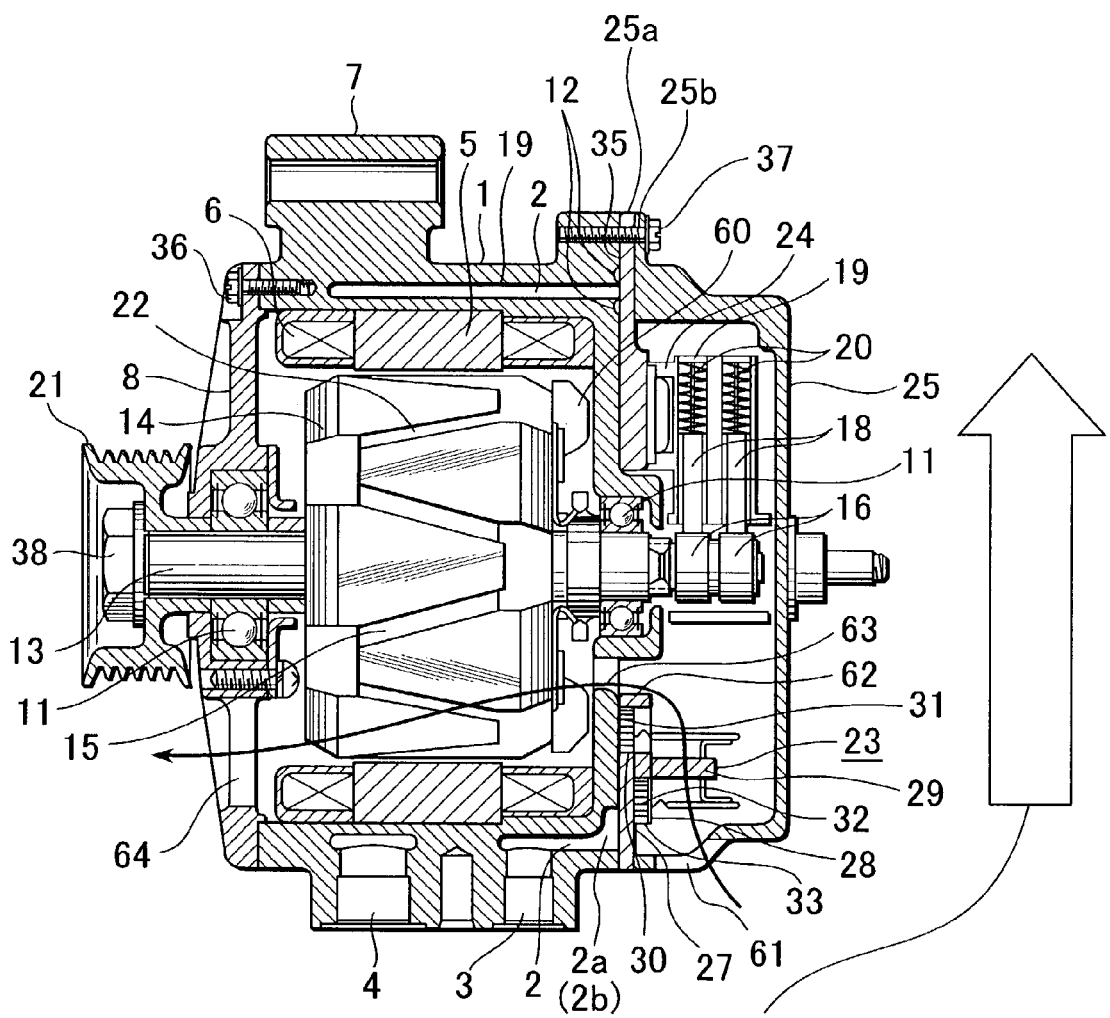
FIG. 7 is a sectional view showing the entire configuration of the alternator for a vehicle according to the second embodiment of the present invention.
Figure 8:
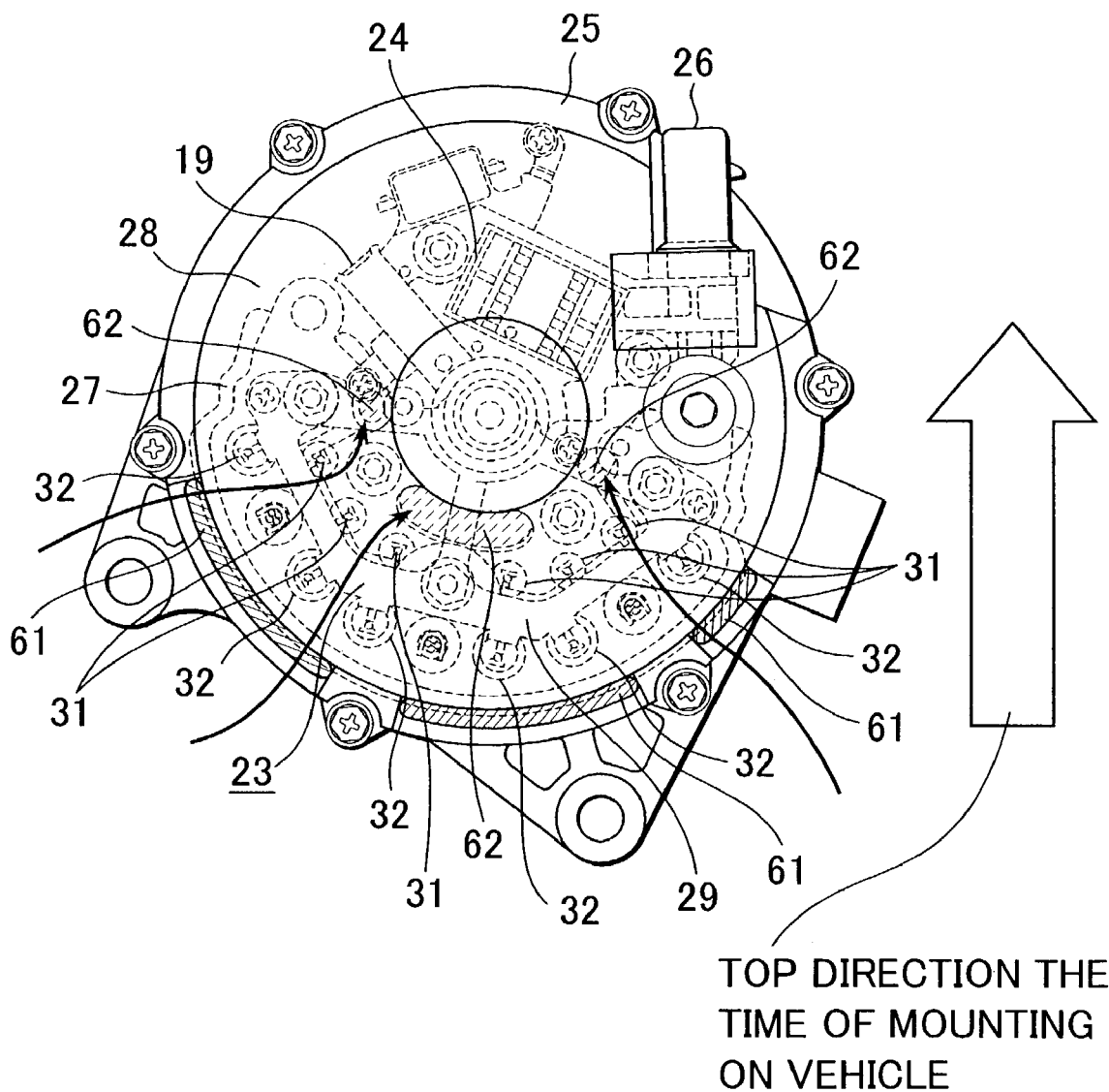
FIG. 8 is a plan view showing the configuration of the one end side of the rotation shaft of the alternator for a vehicle shown in FIG. 7.
Figure 9:
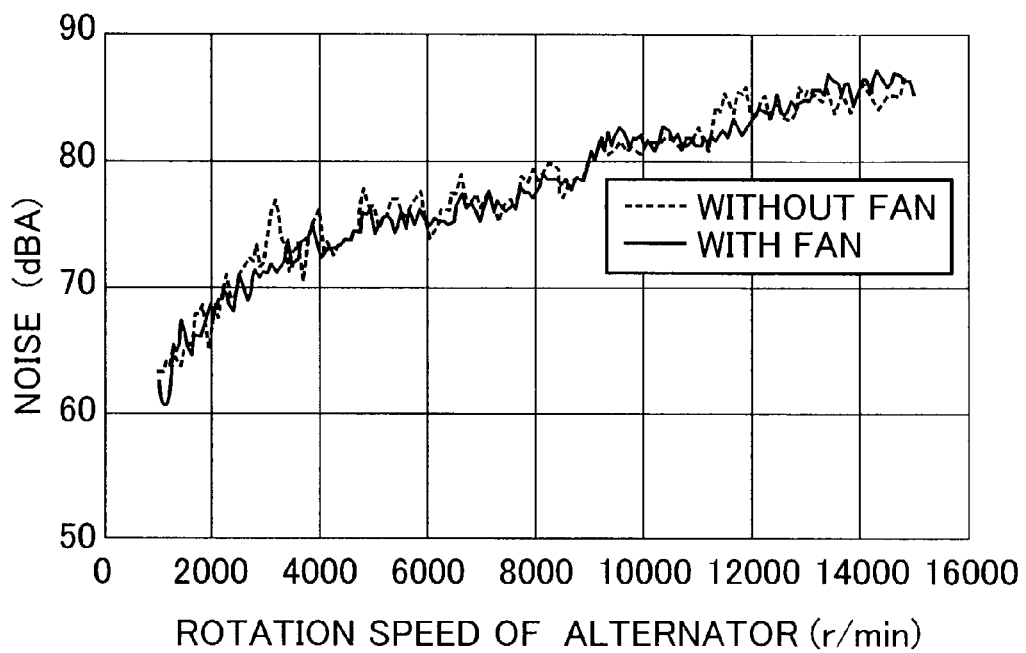
FIG. 9 is a characteristic diagram showing the relation of noise levels with respect to the rotation speeds of the alternator for a vehicle shown in FIG. 7.
Figure 10:
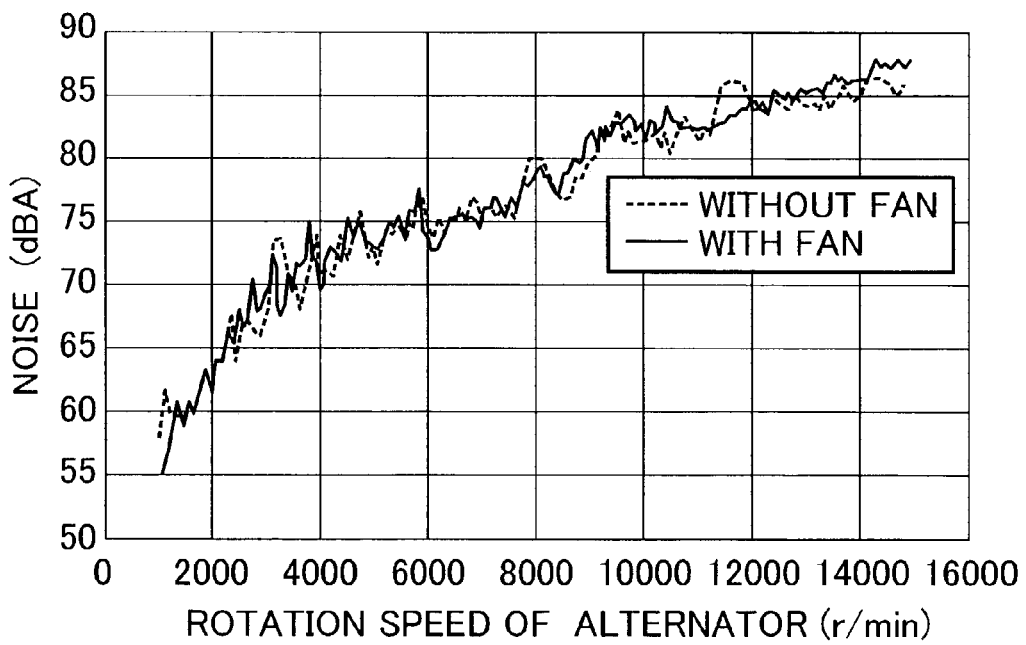
FIG. 10 is a characteristic diagram showing the relation of noise levels with respect to the rotation speeds of the alternator for a vehicle shown in FIG. 7.
Figure 11:
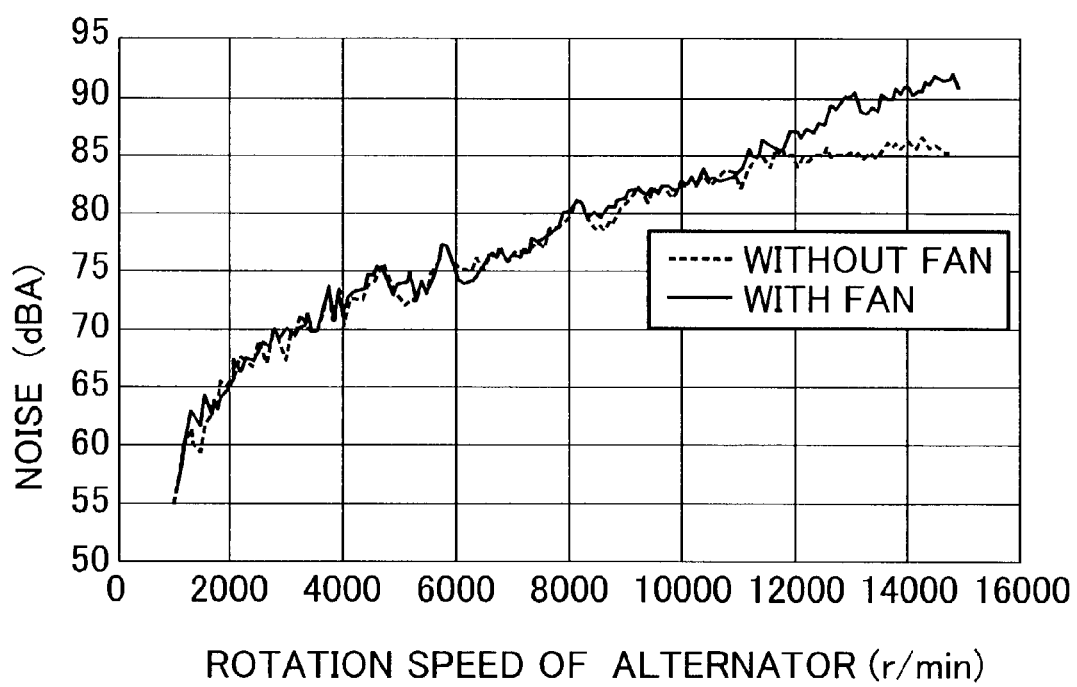
FIG. 11 is a characteristic diagram showing the relation of noise levels with respect to the rotation speeds of the alternator for a vehicle shown in FIG. 7.

The second embodiment of the present invention will be explained based on FIGS. 7 to 11. FIG. 7 shows the entire configuration of the alternator for a vehicle according to the embodiment. FIG. 8 shows the configuration of the one end side of the rotation shaft of the alternator for a vehicle according to the embodiment. FIGS. 9 to 11 show the relation of noise levels with respect to the rotation speeds of the alternator for a vehicle according to the embodiment.

In these figures, portions identical to those of the first embodiment are referred to by the common symbols, with explanation thereof being omitted. Hereinafter, the explanation will be made only as to the portions different from the first embodiment.

The generator according to the embodiment is arranged in a manner that a cooling fan 60 is fixed by welding to the end portion of the end bracket 9 side of the pole core 14. The cooling fan 60 is a mold part which is molded by subjecting an iron plate to the plastic deformation by means of a pressing machine etc. Intake holes 61 (or fresh-air intake holes), which communicate the inner portion of the cover 25 with the outer portion thereof thereby to take cooling air into the inner portion of the cover 25 from the outer portion thereof, are provided at three portions of the peripheral wall 25a of the cover 25, respectively. Each of the intake holes 61 is disposed at the position which is near the rectifier 23 and at the outer side in the radial direction than the rectifier 23, and is opened so as to be along the outer diameter side of the rectifier 23 of an arc shape.

Ventilation holes 62 are formed at three portions of the end bracket 9 at the inner side in the radial direction than the rectifier 23. The ventilation holes 62 are through holes. Ventilation holes 63 are formed at the portions of the side wall 1b opposing to the ventilation holes 62. The ventilation holes 63 are through holes and communicate with the ventilation holes 62. The ventilation holes 62, 63 are disposed in an arc shape along the inner diameter side of the rectifier 23 of the arc shape. Of the ventilation holes 62 and 63, the opening area of each of the ventilation holes 62 and 63 disposed at the center of the arrangement is larger than that of each of the ventilation holes 62 and 63 disposed at the both end portions of the arrangement. A space between the end bracket 9 and the cover 25 and a space, which is closed by the side wall 1b and the end bracket 8 and in which the pole core 14 and the stator core 5 are housed, communicate to each other through he ventilation holes 62, 63.

An exhaust hole 64 is formed at a portion of the end bracket 8. The exhaust hole 64 is a through hole and a communication area thereof is same as that of the intake hole 61. A space which is closed by the side wall 1b and the end bracket 8 and in which the pole core 14 and the stator core 5 are housed communicates with the outside through the exhaust hole 64.

According to the generator of this embodiment thus configured, the cooling fan 60 rotates in accordance with the rotation of the pole core 14, ambient air serving as the cooling air is introduced into the space between the end bracket 9 and the cover 25 through the intake holes 61. The cooling air thus introduced passes near the rectifier 23 and cools the rectifier 23. After the cooling, the cooling air is introduced through the ventilation holes 62 and 63 into the space which is closed by the side wall 1b and the end bracket 8 and in which the stator core 5 and the pole core 14 are hosed. The cooling air thus introduced cools the stator core 5 and the pole core 14. After the cooling, the cooling air is exhausted to the outside through the exhaust hole 64. Arrows in FIGS. 7 and 8 show the flows of the cooling air.

Further, according to the generator of the embodiment, the stator core 5, the rectifier 23, the regulator 24 etc. are cooled by the cooling medium (for example, cooling water) circulating within the cooling medium path 2.

In the aforesaid first embodiment, although the regulator 24 is fixed at the side of the brush holder 19 in opposite to the end bracket 9 side thereof, the regulator 24 is fixed at the surface of the brush holder 19 side of the end bracket 9. According to such a configuration, heat generated by the regulator 24 can be transmitted to the end bracket 9 and so transmitted to the cooling medium flowing through the cooling medium path 2.

Furthermore, according to the generator of the embodiment, a space is provided between the terminal table 29 and the anode side cooling plate 28 of the rectifier 23 so that the cooling air passes through the space. According to such a configuration, the cooling air can sufficiently cool the surface of with a large cooling area portion of the anode side cooling plate 28 and so the rectifier 23 with the largest exothermic heat amount can be cooled efficiently within the space between the end bracket 9 and the cover 25.

Furthermore, according to the generator of the embodiment, since the air between the end bracket 9 and the cover 25 is ventilated while directly cooling the rectifier 23, the brush 18 and the slip ring 16 are also cooled.

The cooling fan 60 is mainly intended to cool the movable parts constituting the generator, for example, the field coil 15 and the slip ring 16 provided at the pole core 14 and to supplementaly cool the rectifier 23. Thus, as compared with the generator of the type cooling only by using the ambient air, it becomes possible to reduce the number of the fans 60, the height of the blades and the number of the blades etc.

Next, the relation of the noise levels with respect to the rotation speeds of the generator according to the embodiment will be explained based on FIGS. 9 to 11. The inventors of the present invention have tested and measured the noise generated by the cooling fan 60. In the measurement, a generator with the cooling fan 60 and another generator without the cooling fan 60 are prepared and each of the generator was driven in a no-load operation.

FIG. 9 shows the measurement result in which a microphone for measurement is disposed at a position away from the cover 25 of the generator by 1 m in the axial line direction of the rotation shaft thereof and noise levels dBa (ordinate) with respect to the rotation speeds r/min (abscissa) of the generator was measured. As the result of the measurement, the noise level at this position was almost same irrespective of the presence or non-presence of the cooling fan.

FIG. 10 shows the measurement result in which the microphone for measurement is disposed at a position away from the generator by 1 m in the vertical direction with respect to the axial line direction of the rotation shaft thereof and noise levels dBa (ordinate) with respect to the rotation speeds r/min (abscissa) of the generator was measured. As the result of the measurement, the noise level at this position was almost same irrespective of the presence or non-presence of the cooling fan.

FIG. 11 shows the measurement result in which the microphone for measurement is disposed at a position away from the end bracket 8 of the generator by 1 m in the axial line direction of the rotation shaft thereof and noise levels dBa (ordinate) with respect to the rotation speeds r/min (abscissa) of the generator was measured. As the result of the measurement, the noise level at this position was almost same irrespective of the presence or non-presence of the cooling fan when the rotation speed of the generator is about 12,000 r/min or less.

When the rotation speed of the generator exceeds about 12,000 r/min, the noise level of the generator with the fan becomes slightly larger than that of the generator without the fan. However, in the case where the generator is mounted on the engine of an automobile, the ratio between the rotation speed of the crank shaft of the engine and the rotation speed of the generator is set almost to be 1:1.5 to 3. Thus, when the engine rotates at the speed of 12,000 r/min, the engine rotates at the speed in a range of 4,000 to 8,000 r/min. Thus, the noise level of the engine becomes excessive as compared with that of the generator and so the noise level difference between the generator with the fan and the generator without the fan does not become a problem.

According to the embodiment explained above, since the rectifier is fixed to the end bracket 9 constituting the cooling medium path 2, the end bracket 9 side of the rectifier 23 can be cooled. Further, since the cooling air is introduced into the space between the end bracket 9 and the cover 25 through the intake holes 61 formed at the cover 25, the side of the rectifier 23 in opposite to the end bracket 9 side thereof can be cooled. Thus, according to the embodiment, the rectifier 23 can be cooled at the both sides thereof and so the cooling efficiency of the rectifier 23 can be improved. Accordingly, the cooling performance of the rectifier 23 can be improved.

Further, according to the embodiment, since the intake holes 61 are provided near the rectifier 23 and the introducing area of the cooling air is limited only to the vicinity of the rectifier 23, the flowing speed of the cooling air can be increased and the cooling efficiency of the rectifier 23 can be further improved. Further, since the cooling air can be positively flown to the rectifier 23, the cooling efficiency of the rectifier 23 can be further improved.

Further, according to the embodiment, since the introducing area of the cooling air is limited, despite that the generator is an open-type generator, corrosion accelerating material such as water, salt spread over the road for anti-freezing, snow melting material can be suppressed from entering into the generator, so that resistance to environment can be improved.

With respect to the method of increasing the voltage to 42 volt, for example, which is one of the methods of improving fuel cost of a vehicle, in order to prevent the promotion of corrosion due to the increase of the voltage, it is considered to employ a generator to be cooled by the cooling medium other than ambient air thereby to improve the resistance to environment. In order to further improve the heat-resistance performance while improving the resistance to environment in this generator, it is effective to introduce the cooling air within the generator by limiting the introduction area of the cooling air like the present embodiment.

Further, according to the embodiment, since the cooling fan 60 is attached to the end portion of the pole core 14 on the end bracket 9 side, noise caused by the cooling fan 60 can be suppressed to a small level. That is, since the space between the end bracket 9 and the cover 25 exists between the cooling fan 60 and the outside and further the introduction area of the cooling air is limited, noise caused by the cooling fan 60 can be suppressed to a small level. On the other hand, at the end bracket 8 side, since a magnetic space between the stator core 5 and the pole core 14 has normally a quite small value of 1 mm or less and the pole core 14 serves as a shielding member. Thus, noise caused by the cooling fan 60 can also be suppressed to a small level at the end bracket 8 side.

Furthermore, according to the embodiment, since the noise of the cooling fan 60 can be reduced, the cooling fan 60 can be fabricated at a low cost through the plastic deformation of metal instead of forming by molding resin. Further, according to the cooling fan 60 made of metal which is higher in thermal conductivity than resin, heat generated from the field coil 15 can be transmitted to the cooling fan 60 through the pole core 14 and so dissipated. That is, the cooling fan 60 can be used as a cooling fin.

Furthermore, according to the embodiment, since the holes 6, 63 are formed near the rectifier 23, the cooling air within the space between the end bracket 9 and the cover 25 can be flown smoothly. Thus, not only the cooling efficiency of the rectifier 23 but also the cooling efficiency of the space between the end bracket 9 and the cover 25 can be improved, so that the cooling efficiency of each of the brush 18 and the slip ring 16 can also be improved.

Furthermore, according to the embodiment, since the cooling efficiency of each of the brush 18 and the slip ring 16 can be improved, the life times of the brush 18 and the slip ring 16 can be made longer.

Figure 12:
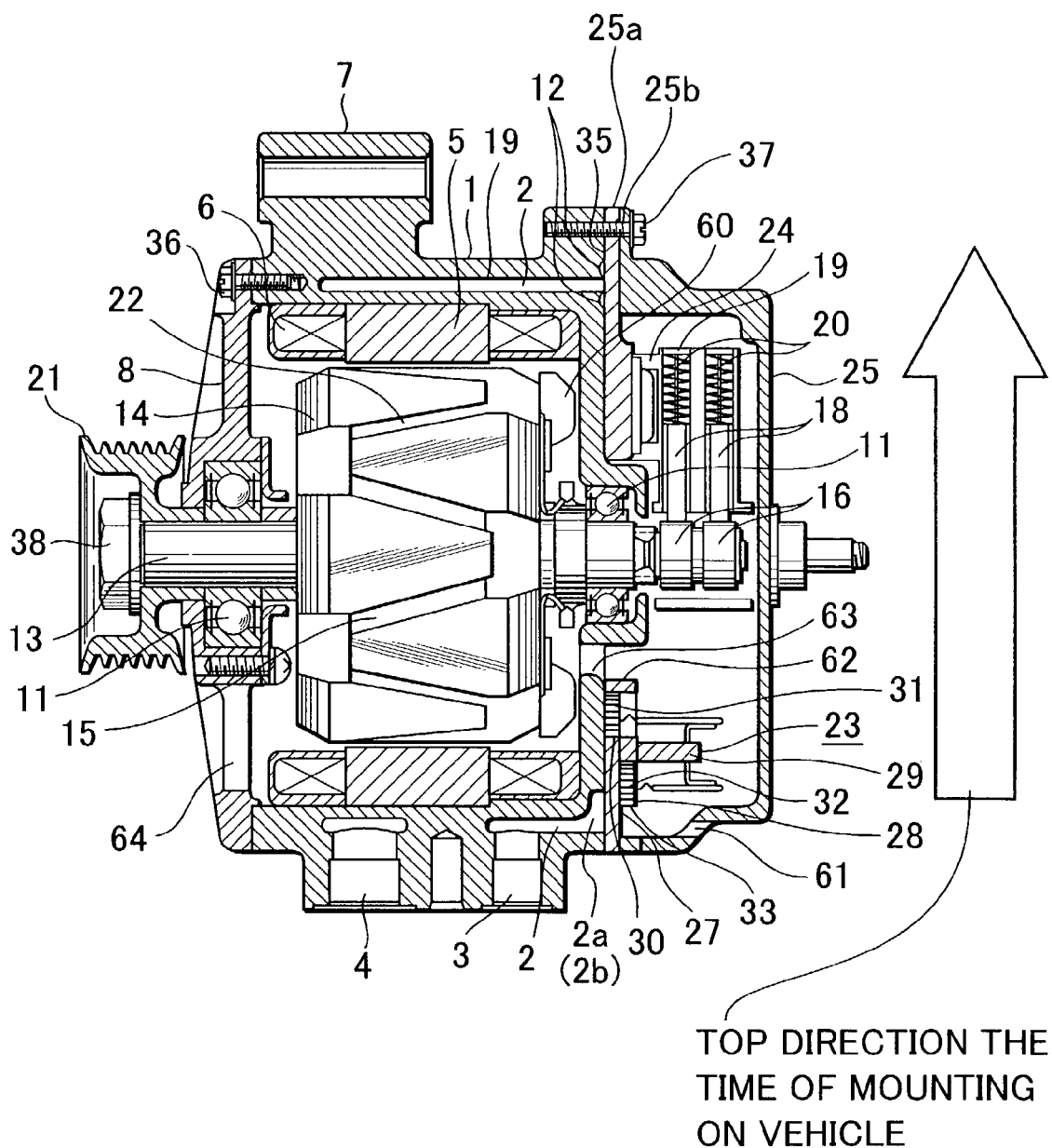
FIG. 12 is a sectional view showing the entire configuration of the alternator for a vehicle according to the third embodiment of the present invention.
Figure 13:
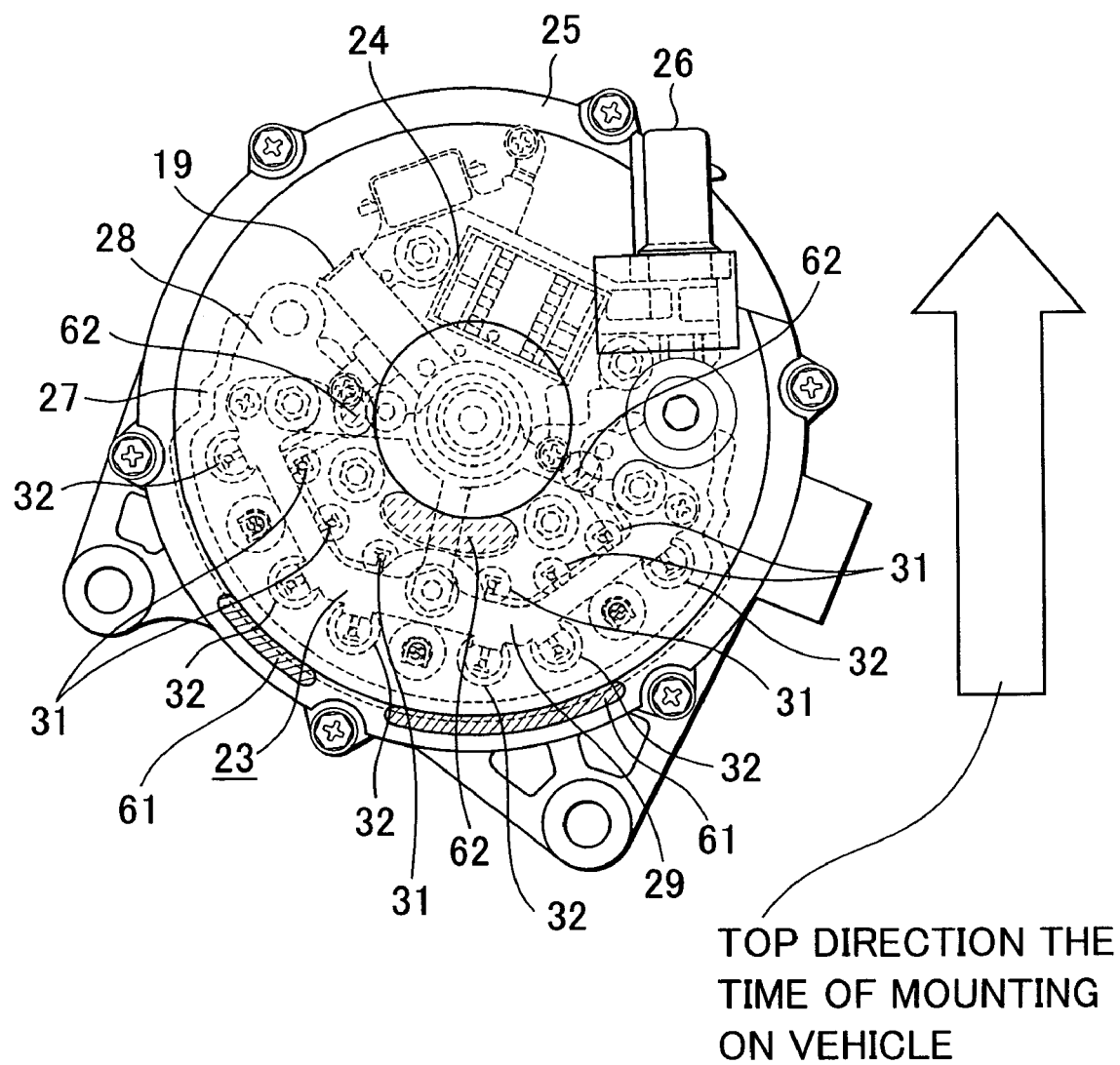
FIG. 13 is a plan view showing the configuration of the one end side of the rotation shaft of the alternator for a vehicle shown in FIG. 12.

The third embodiment of the present invention will be explained based on FIGS. 12 and 13. FIG. 12 shows the entire configuration of the alternator for a vehicle according to the embodiment. FIG. 13 shows the configuration of the one end side of the rotation shaft of the alternator for a vehicle according to the embodiment.

The axial line direction of the rotation shaft of the generator is almost perpendicular to the elevational direction of the generator in the case where the generator is mounted on a vehicle. Arrows shown in the figures show the top direction when the generator is mounted on a vehicle. In the aforesaid embodiment, since the intake holes 61 are opened in the ground direction, water wound up by tires at the time of running of the vehicle, salt spread over the road for antifreezing and snow melting material etc. may enter into the generator and so promote corrosion of the constituent parts. Thus, according to the embodiment, the intake holes 61 are opened in the axial line direction of the rotation shaft of the generator. Accordingly, water and corrosion promotion material are prevented from directly entering into the generator.

In this case, the cooling air introduced into the space between the end bracket 9 and the cover 25 from the intake holes 61 is once bent almost at right angle. Thus, the ventilation resistance of the cooling water increases and so the cooling efficiency of the rectifier 23 by the cooling air reduces. However, since the rectifier 23 mounted on the generator of the present embodiment is cooled by the cooling medium circulating within the cooling medium path 2, the cooling efficiency of the rectifier 23 reduces slightly.

Figure 14:
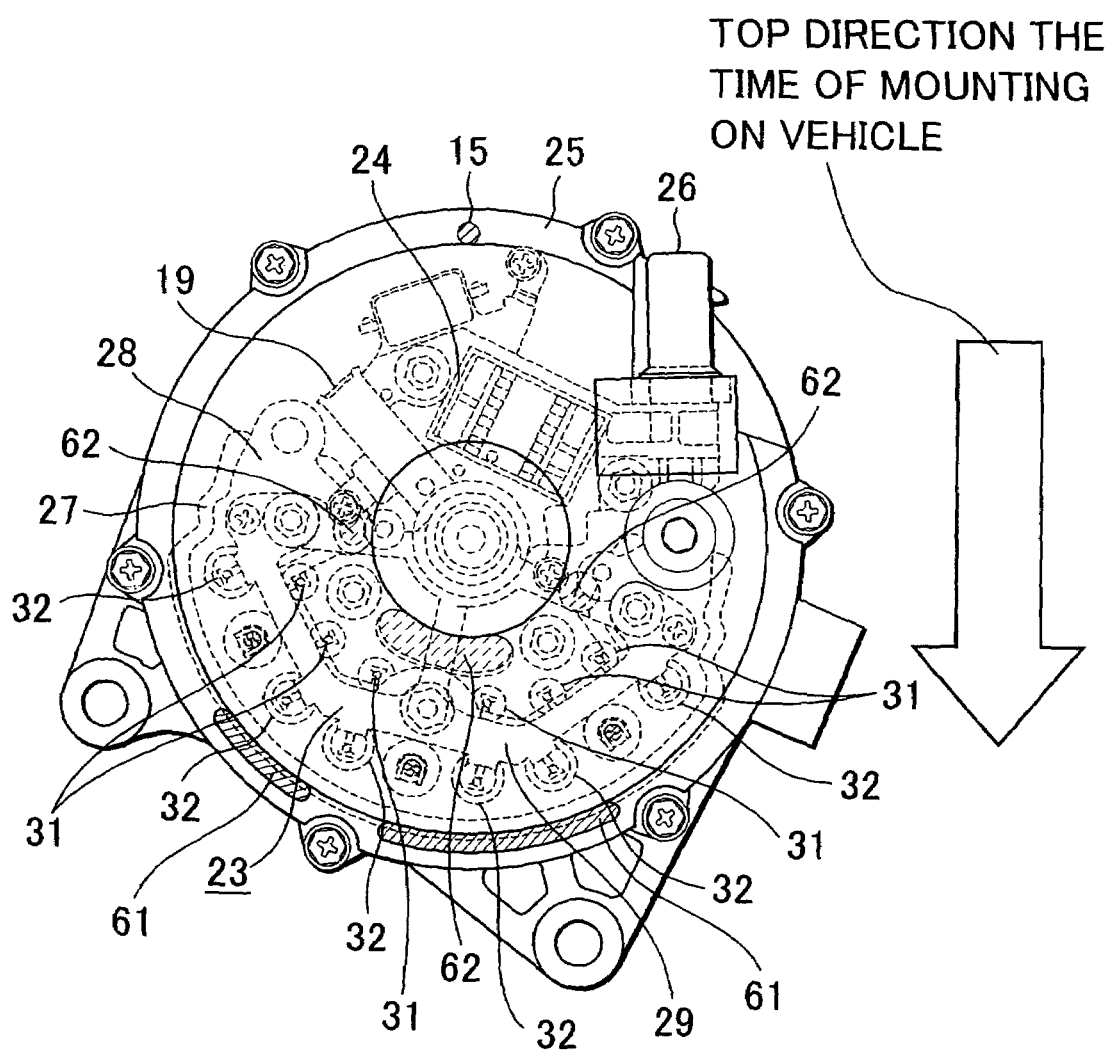
FIG. 14 is a sectional view showing the configuration of the one end side of the rotation shaft of the alternator for a vehicle according to the fourth embodiment of the present invention.

The fourth embodiment of the present invention will be explained based on FIG. 14. FIG. 14 shows the configuration of the one end side of the rotation shaft of the alternator for a vehicle according to the embodiment.

The present embodiment intends to improve the resistance to environment like the aforesaid embodiment. In this embodiment, the number of the intake holes 61 opened in the ground direction is reduced and the opening area thereof is reduced. To this end, the intake holes 61 are disposed at positions corresponding to a position where the rectifying diodes 32 which temperature is relatively high are concentrated. In this embodiment, the two intake holes 61 are provided so as to correspond to the center portion of the diode 23 of an arc shape. According to the present embodiment thus configured, the resistance to environment can be improved and the cooling efficiency of the rectifier 23 can be improved.

Figure 15:
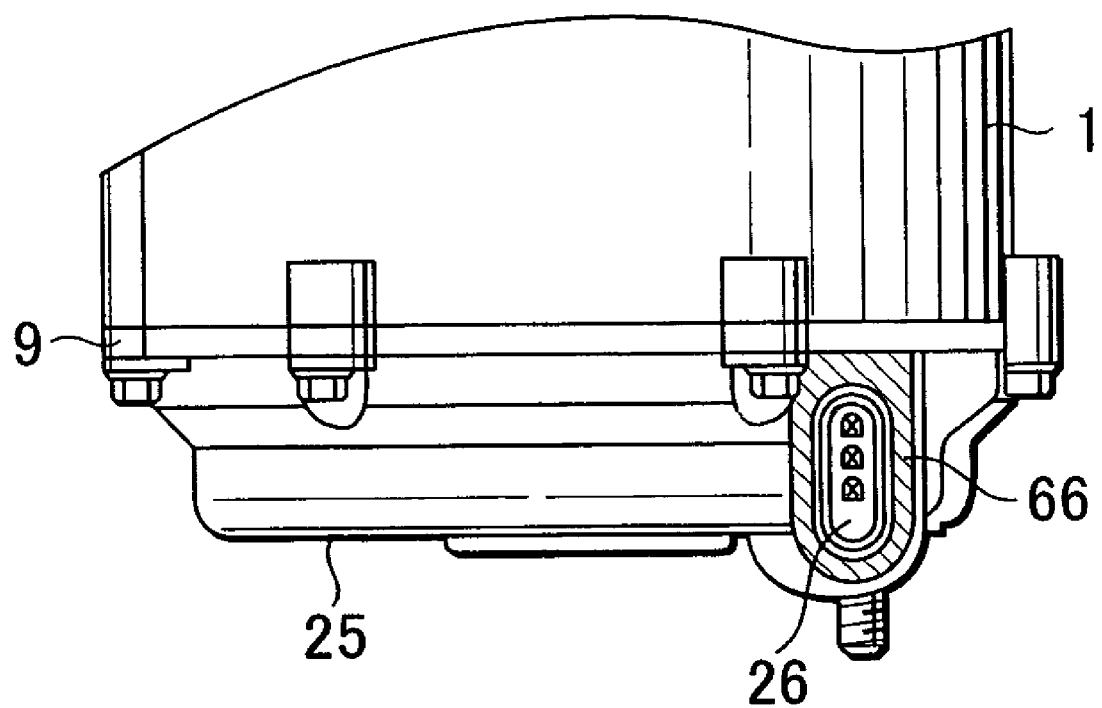
FIG. 15 is a sectional view showing the configuration of the one end side of the rotation shaft of the alternator for a vehicle according to the fifth embodiment of the present invention.

Next, the fifth embodiment of the present invention will be explained based on FIG. 15. FIG. 15 shows the configuration of the one end side of the rotation shaft of the alternator for a vehicle according to the embodiment.

In this embodiment, the intake holes 61 are opened in the top direction when the generator is mounted on a vehicle. In this embodiment, drain holes 65 are provided at the side (the side of the cover 25 directed to the ground) of the cover 25 in opposite to the intake holes 61 side thereof. The opening area of each of the drain holes 65 is quite small as compared with that of the intake hole 61. According to the present embodiment thus configured, moisture entered into the generator from the outside through the intake holes and moisture caused within the generator due to dew condensation etc. can be exhausted outside.

Although the air flow amount and flow rate of the cooling air introduced from the vicinity of the rectifier 23 change by the drain holes 65 thereby to influence the cooling efficiency of the rectifier 23, since the opening area of each of the drain holes 65 is smaller than that of the intake hole 61, the influence is small. Such a drawback is smaller as compared with such an advantage that the moisture collected within the generator can be exhausted and so the corrosion resistance of the generator can be improved.

Figure 16:
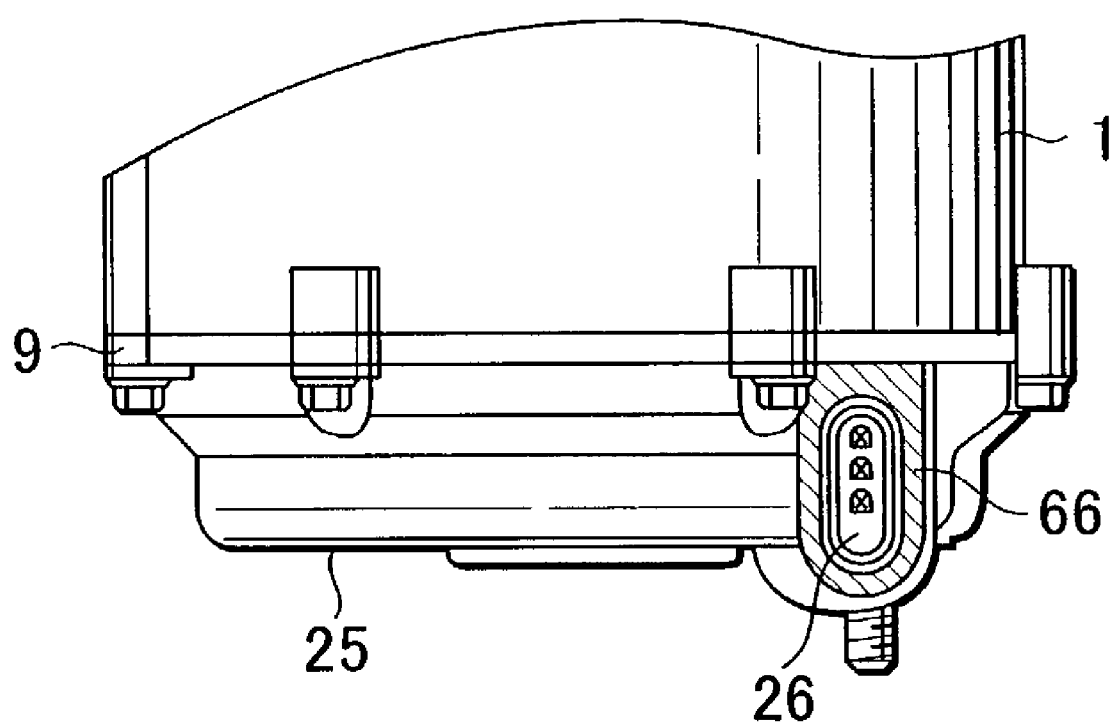
FIG. 16 is a plan view showing the external configuration of the periphery of a terminal for coupling a regulator with the wiring on a vehicle side at one end side of the rotation shaft of the alternator for a vehicle according to the sixth embodiment of the present invention.

Next, the sixth embodiment of the present invention will be explained based on FIG. 16. FIG. 16 shows the external configuration of the periphery of a terminal 26 (or a connector) for coupling the regulator 24 with the wiring on the vehicle side at one end side of the rotation shaft of the alternator for a vehicle according to the embodiment.

The terminal 26 is exposed outside from the cover 25. A gap appears between the terminal 26 and the cover 25 due to size error caused at the time of manufacturing. In this embodiment, a sealing member 66 is buried within the gap between the terminal 26 and the cover 25 so as to fill and seal the gap between the terminal 26 and the cover 25. The sealing member 66 is a flexible member such as urethane or rubber.

According to the present embodiment thus configured, at the time of introducing the cooling air, the cooling air is not introduced from the gap between the terminal 26 and the cover 25 but is introduced only from the intake holes 61 provided in the vicinity of the rectifier 23. Thus, since the air flow amount and flow rate of the cooling air passing through the rectifier 23 are not reduced, the cooling efficiency of the rectifier 23 can be improved. Further, since the corrosion promotion material etc. can be prevented from entering from the gap between the terminal 26 and the cover 25, the resistance to environment can be improved. Further, since the sealing member 66 is buried into the gap between the cover and the member such an output terminal exposing outside from the cover 25, the aforesaid effect can be further enhanced.

According to the present invention as explained above, since the cooling efficiency of the rectifier can be improved, the cooling performance of the rectifier can be improved. Thus, according to the present invention, an alternator for a vehicle which can improve the cooling performance of the rectifier can be provided.

What is claimed is:

1. An alternator for a vehicle comprising:
   a stator having a stator winding;
   a rotor having a field winding and opposing to the stator through a gap;
   a rectifier for converting AC power generated by the stator winding into DC power;
   a frame which holds the stator and has a cooling medium path at least one end thereof being opened; and
   an end plate for hermetically closing the opened end of the cooling medium path, wherein
   a cathode side rectifying element constituting the rectifier is fixed to a portion of the end plate not opposing to the cooling medium path, and
   a cooling member, at which an anode side, rectifying element constituting the rectifier is fixed, is fixed to the end plate in an insulated state so that the anode side rectifying element is disposed at a position having a lower temperature than a temperature of a fixed position where the cathode side rectifying element is disposed.

2. An alternator for a vehicle according to claim 1, further comprising
   a cover member which covers the rectifier, wherein the cover member includes an intake hole for cooling air which is provided at a portion near the rectifier and outer side in radial direction than the rectifier.

3. An alternator for a vehicle according to claim 2, wherein the intake hole is opened in a same direction as an axial line direction of a rotation shaft of the rotor.

4. An alternator for a vehicle according to claim 2, further comprising
   an exhaust hole which is provided at a portion of the cover member in opposite to the intake hole side thereof and has an opening which sectional area is smaller than a sectional area of an opening of the intake hole.

5. An alternator for a vehicle according to claim 2, further comprising
   a ventilation hole which is provided at the end plate so as to communicate a space between the end plate and the cover member with a space where the stator and the rotor exist and introduce cooling air taken into the space between the end plate and the cover member into the space where the stator and the rotor exist.

6. An alternator for a vehicle according to claim 5, wherein the ventilation hole is provided at a portion near the rectifier and inner side in a radial direction than the rectifier.

7. An alternator for a vehicle according to claim 5, wherein the rotor has a fan at the end plate side thereof.

8. An alternator for a vehicle according claim 2, further comprising
   a terminal capable of being electrically coupled to outside, wherein the terminal exposes the outside from the cover member, and a gap formed between the terminal and the cover member is sealed by the sealing member.

9. An alternator for a vehicle according to claim 2, further comprising
   an exhaust hole for exhausting cooling air taken into a space where the stator and the rotor exist, the exhaust hole being disposed at a side of a pulley provided a tone end of the rotation shaft of the rotor and being provided at a side wall of the frame at which a bearing for rotatably supporting the rotation shaft of the rotor is held.

10. An alternator for a vehicle according to claim 1, wherein the position lower in temperature than the fixed position of the cathode side rectifying element is closer to the cooling medium path and at outer side in a radial direction than the cathode side rectifying element.

11. An alternator for a vehicle according to claim 1, wherein the position lower in temperature than the fixed position of the cathode side rectifying element is proximal to the cooling medium path.

12. An alternator for a vehicle according to claim 11, wherein the intake hole is opened in a same direction as an axial line direction of a rotation shaft of the rotor.

13. An alternator for a vehicle according to claim 1, wherein the cathode side rectifying element is buried at a portion of the end plate not opposing to the cooling medium path and contacts with a wall surface of the frame at which a bearing for rotatably holding a rotation shaft of the rotor is held.

14. An alternator for a vehicle according to claim 1, wherein the cathode side rectifying element is buried at a portion of the end plate not opposing to the cooling medium path and contacts, through a material having a thermal conductivity larger than air, with a wall surface of the frame at which a bearing for rotatably holding a rotation shaft of the rotor is held.

15. An alternator for a vehicle comprising:
   a stator having a stator winding;
   a rotor having a field winding and opposing to the stator through a gap
   a rectifier for converting AC power generated by the stator winding into DC power;
   a frame which holds the stator and has a cooling medium path at least one end thereof being opened;
   an end plate which hermetically closes the opened end of the cooling medium path and at which the rectifier is fixed; and
   a cover member which covers the rectifier, wherein the cover member includes an intake hole for cooling air which is provided at a portion near the rectifier and outer side in radial direction than the rectifier.

16. An alternator for a vehicle according to claim 15, further comprising
   an exhaust hole which is provided at a portion of the cover member in opposite to the intake hole side thereof and has an opening which sectional area is smaller than a sectional area of an opening of the intake hole.

17. An alternator for a vehicle according to claim 15, further comprising
   a ventilation hole which is provided at the end plate so as to communicate a space between the end plate and the cover member with a space where the stator and the rotor exist and introduce cooling air taken into the space between the end plate and the cover member into the space where the stator and the rotor exist.

18. An alternator for a vehicle according to claim 17, wherein the ventilation hole is provided at a portion near the rectifier and inner side in a radial direction than the rectifier.

19. An alternator for a vehicle according to claim 17, wherein the rotor has a fan at the end plate side thereof.

20. An alternator for a vehicle according to claim 15, further comprising
- a terminal capable of being electrically coupled to outside, wherein the terminal exposes the outside from the cover member, and a gap formed between the terminal and the cover member is sealed by a sealing member.

21. An alternator for a vehicle according to claim 15, further comprising
- an exhaust hole for exhausting cooling air taken into a space where the stator and the rotor exist, the exhaust hole being disposed at a side of a pulley provided at one end of the rotation shaft of the rotor and being provided at a side wall of the frame at which a bearing for rotatably supporting the rotation shaft of the rotor is held.

* * * * *